Figure 1:
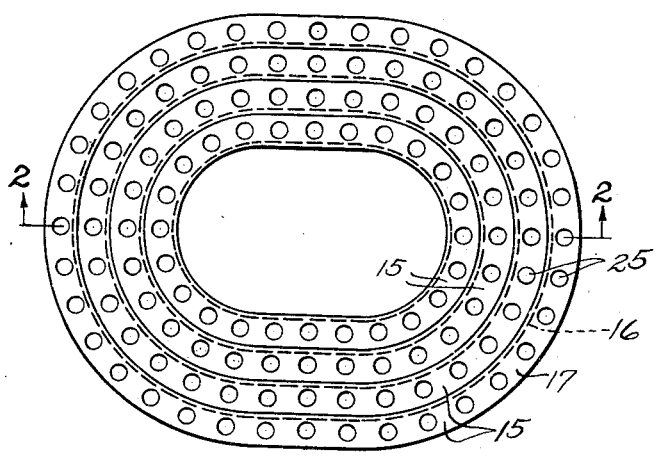

Sept. 12, 1933.  M. L. CORLETT  1,926,836

STORAGE REEL

Filed May 20, 1931

Inventor

Martin L. Corlett

By Bates, Golrick & Feare

Attorneys

Patented Sept. 12, 1933

1,926,836

UNITED STATES PATENT OFFICE 1,926,836

STORAGE REEL

Martin L. Corlett, Bay Village, Ohio

Application May 20, 1931. Serial No. 538,788

2 Claims. (Cl. 242—104)

This invention relates to an improvement in storage reels, and especially to an improved reel for the storing and drying of fish lines and the like.

The general object of this invention is to provide a storage reel on which fish lines and the like may be stored and dried. A further object is to provide a storage reel comprising a series of spools adapted to be nested one within the other, and wherein all of the spools may be removed from a container as a unit, or each spool removed independently, as desired.

Another object is to provide a series of storage spools for fish lines and the like, on which the lines may be wound for storage purposes, and wherein exceptionally long lines may be conveniently wound on a plurality of successive spools.

Other objects of this invention will become apparent from the following description, referring to a preferred embodiment of my invention which is illustrated in the drawing, and the essential characteristics will be set forth in the claims.

Figure 2:
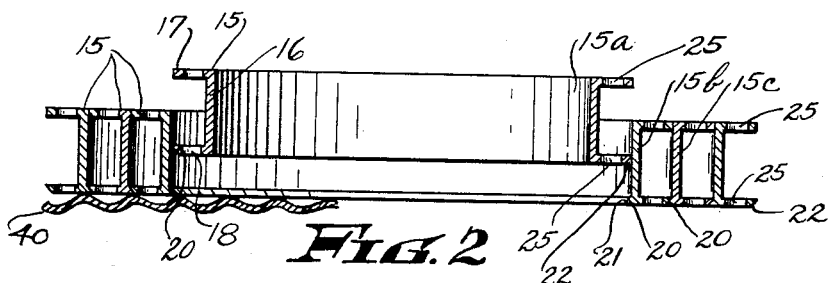
Figure 3:
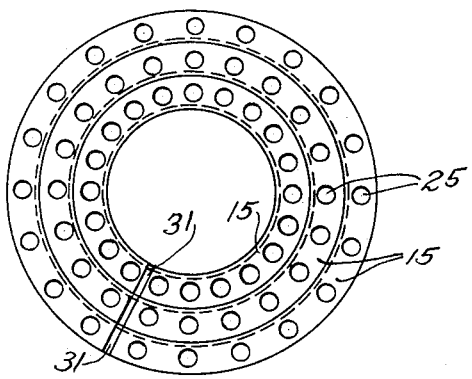
Figure 5:
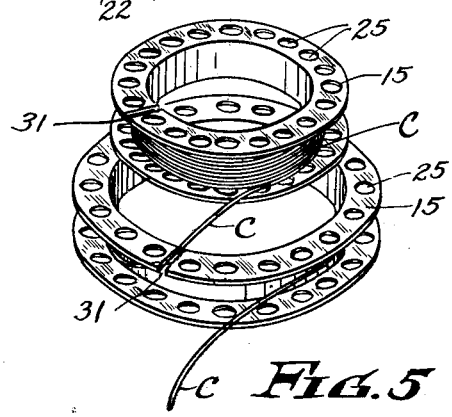
Figure 4:

In the drawing, Fig. 1 is a plan of my improved storage reel; Fig. 2 is a transverse section of the reel, one of the members thereof being slightly lifted above the remaining members, the plane of the section being indicated by the lines 2—2 on Fig. 1; Fig. 3 is a plan view of a modified form of my invention; Fig. 4 is a side elevation, partly broken away of the storage reel illustrated in Fig. 3; Fig. 5 is a perspective view illustrating the manner of winding the cord or line on a plurality of successive reels.

My improved reel comprises a series of channel-shaped annular spools 15, each spool being smaller than the preceding one, and adapted to nest within it to provide a compact construction. The spools 15 are arranged in an interlocking relation to each other, permitting the removal of the entire reel as a unit from its container. Likewise, the arrangement is such that the units may be removed, one at a time.

Each spool 15 comprises an elliptical channel having an annular web 16 provided with outward extending top and bottom flanges 17 and 18, between which the line or cord is wound. The spools 15 are preferably made of a non-metallic substance, such as bakelite or some other similar composition material. The spools 15 are of such size that they nest one within the other. The outer edges of the flanges 17 and 18 of the spool 15a (Fig. 2) contacting with the inner face of the web 16 of the spool 15b; the outer edges of the flanges 17 and 18 of the spool 15b contacting with the inner face of the web 16 of the spool 15c, etc. As many spools 15 may be provided as required to accommodate the desired amount of line or lines.

The spools 15 are so arranged that they interlock to permit the removal of all of the spools as a unit from a container by grasping the outermost spool, or to permit the removal of one spool individually, as desired. To this end, the web 16 of each spool is provided with an inwardly extending annular flange 20, the upper surface of which is bevelled, as at 21, and adapted to support the next adjacent spool. The lower flange 18 of each spool 15 is bevelled, as at 22 in Fig. 2, the angle of the bevel being complimentary to the angle of the bevel of the flange 20. This permits the spools to be placed one within the other in a compact relationship. Likewise, each spool supports itself when the reel is placed on a comparatively flat surface, thus relieving the flanges 20 of the outermost unit of the weight of the remaining units when so supported.

It is often desirable to wind the cord C on the storage reel before the cord is entirely dry. I therefore provide means whereby the space between the flanges of each spool 15 is ventilated. To this end the top and bottom flanges 17 and 18 of each spool 15 are provided with a series of openings 25, which permit the circulation of air currents through the area between the flanges. I find this permits the cord to be wound on the reels in a moist condition and dried thereon. The supporting surface 40 is preferably corrugated, indicated by the dotted lines in Fig. 2. This materially aids the circulation of air to the spools.

Each of the spools 15 is of sufficient size ordinarily to hold one entire line. However, it is often desirable to store an exceptionally long line which may require two or more spools. Also, when the spools are circular, as shown on Figs. 3, 4 and 5, the capacity of the inner spool is comparatively small, and, as it is not desirable to increase the storage area by lengthening the flanges, as this would tend to decrease the efficiency of the reel as a drying unit, I desire to so construct the spool that a continuous line may be wound around several units consecutively.

As shown in Figs. 3, 4 and 5, the upper flange of each unit is provided with a slot 31, which extends through the flange and a portion of the web 16. This arrangement permits the cord to be wound on the innermost spool of the reel, and when that spool is filled it is inserted in the next spool, the cord passing freely through the slot 31 of the second spool, which is then wound to capacity, and so on. Hence, the entire reel may be utilized for a single line, without danger of kinking or abrading the line, and still maintain the efficiency of the reel as a drying unit.

From the foregoing description, it is apparent that I have provided a reel for the storage of fish lines, and the like, which reel is simple, readily manufactured and so constructed as to occupy a minimum amount of storage space. My improved reel permits moist or wet lines to be stored thereon, without danger of deterioration of the lines, and may readily be wound with one continuous line or a plurality of lines, each of which may be unwound from the reel without disturbing the remaining lines.

I claim:

1. A reel comprising a series of nested spools, each spool comprising a web having top and bottom flanges provided with a series of openings therein, wherein the web of one spool closes the channel formed by the flanges of the next adjacent spool, and an inwardly extending tapered rib associated with the web of each spool and adapted to coact with a bevelled edge of the bottom flange of the next adjacent spool to permit all of the spools to be raised as a unit from the supporting surface.

2. A reel comprising a series of nested concentric spools, each spool comprising a web having outwardly extending top and bottom flanges, wherein the web of one spool closes the channel formed by the flanges of the next adjacent spool, an inwardly extending rib carried by each spool and arranged to coact with one of the flanges on the next adjacent spool to permit all of the spools to be raised from the supporting surface as a unit or one at a time, as desired.

MARTIN L. CORLETT.